Nov. 29, 1932.                S. C. ATKINSON                1,889,624
                                  CUTTER
                             Filed Feb. 2, 1932
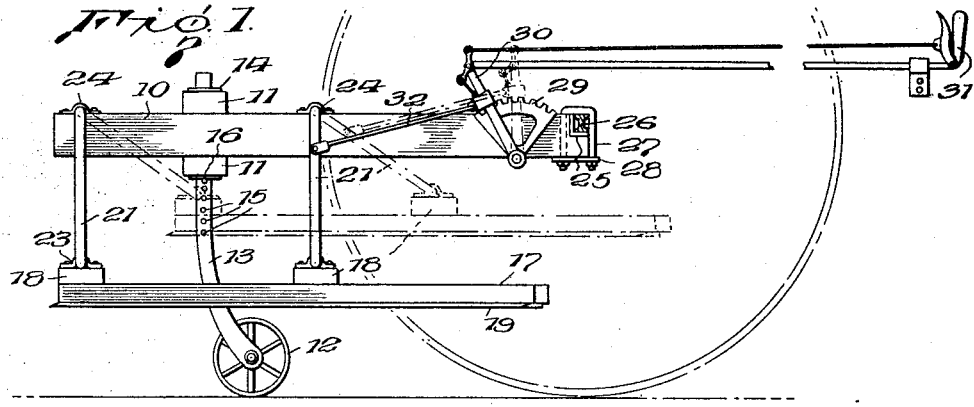
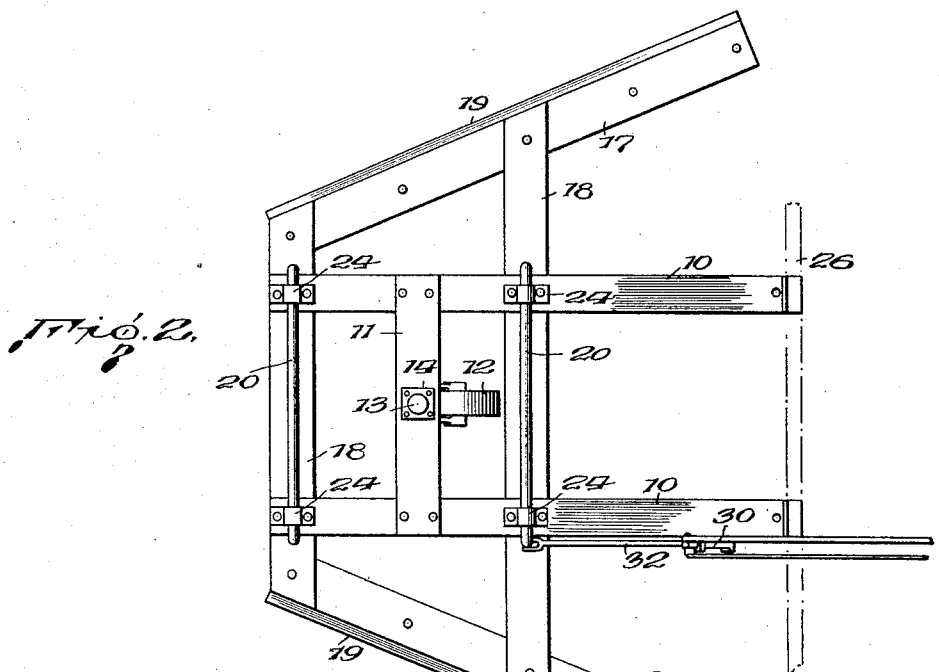
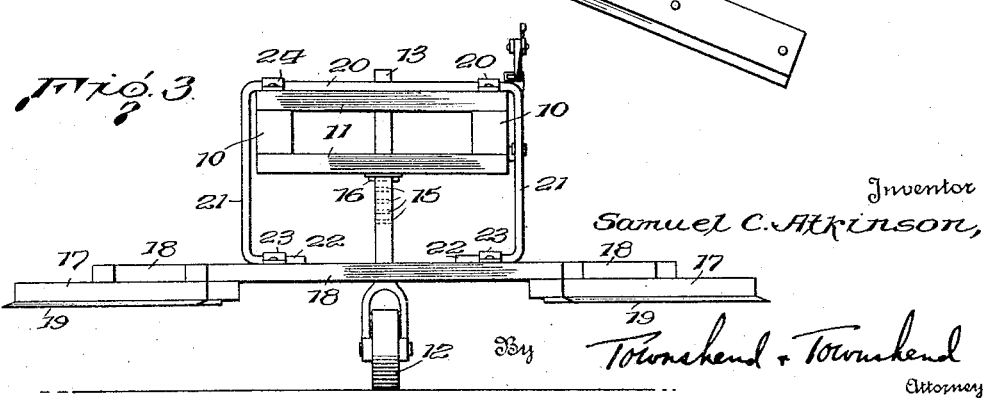
Inventor
Samuel C. Atkinson,
By Townshend + Townshend
Attorney Patented Nov. 29, 1932

1,889,624

UNITED STATES PATENT OFFICE

SAMUEL C. ATKINSON, OF COLUMBUS, NEW JERSEY

CUTTER

Application filed February 2, 1932. Serial No. 590,490.

This invention relates to agricultural implements and particularly that class of such instruments which are utilized as means for cutting stalks, weeds, vines, and the like where it is desired to clear a field or other ground for subsequent treatment.

An object of this invention is the provision of a mobile frame equipped with cutter blades and adapted to be attached to a tractor unit in a manner to extend forwardly thereof for operation without necessitating any change or adjustment of the tractor construction.

Another object of the invention is the provision of a cutter frame having means for attaching the same to a tractor and having means for adjusting cutter elements carried by the frame with respect to the ground surface. Other objects will be apparent from the description.

The present disclosure constitutes a preferred embodiment of the invention and it is to be understood that the structural details as shown shall not constitute limitations inconsistent with the scope of the invention as claimed.

Figure 1 of the drawing is a side elevation of a cutter constructed in accordance with this invention and as mounted in service position.

Figure 2 is a top plan view thereof.

Figure 3 is a front elevation of the attachment.

In detail the cutter attachment consists of an open frame comprising spaced parallel beams 10 connected by a cross beam 11 disposed adjacent the forward end of the frame. A ground bearing wheel 12 is journalled at the lower end of an upright spindle 13 having a swiveled bearing in blocks 14 attached to the transverse brace beam 11. The shank of the spindle 13 is provided with a plurality of transverse bores 15 at vertically spaced intervals for the reception of a supporting pin 16 adapted to be passed through one of the bores 15 and to bear against the lower bearing block 14 whereby the frame is supported from the wheel 12. By varying the position of the pin 16 it is obvious that the frame may be elevated or lowered with respect to the ground surface.

The cutter element of the attachment consists of a substantially V-shaped frame made up of side bars 17 connected by cross bars 18. Laterally and outwardly directed cutter blades 19 are secured in any suitable manner to the side bars 17. The cutter frame is suspended pivotally from the main frame by means of yokes 20, formed preferably of round steel bars, which extend transversely of the beams 10 across the tops thereof with leg portions 21 directed downwardly and terminating in inwardly directed terminal portions 22 attached in pivotal relation to the frame bars 18 by straps 23. Straps 24 serve to position the yokes 20 on the beams 10. By this construction it will be apparent that the depending portions 21 of the yokes have a two point pivotal connection with the upper main frame and the lower or cutter carrying frame whereby the cutter frame may be rocked with respect to the main frame for raising and lowering into a desired adjustment.

The rear ends of the main frame beams 10 are notched and faced with angle iron seats 25 to engage under and receive the front axle 26 of a tractor to which the cutter is attached in service. U bolts 27 cooperating with anchor plates 28 are provided to take over the top of the tractor axle 26 and secure the frame in attached relation, the beams 10 being drilled to receive the shanks of the U bolts as clearly indicated in Figure 1. While this is a preferred manner of attaching the frame to a tractor, other suitable means may be employed so long as no change is required in the tractor structure and so long as the frame extends forwardly of the tractor when in service position.

One of the beams 10 has attached thereto sector rack means 29 cooperating with a pivoted lever 30 controlled from an operating handle 31 adapted to be mounted on the tractor adjacent an operator's seat and which has a link connection 32 with one of the depending yoke arms 21. The rack and lever construction is conventional and it is obvious that when the lever 30 is appropriately operated the cutter frame may be swung in a vertical arc to raise and lower the cutters 19 with respect to the ground surface, thus effecting an adjustment which operates independently of the adjustment secured through the bearing wheel spindle 13.

In service the device is attached to the front axle of a tractor as indicated in Figure 1 and proper elevation is obtained through adjusting the bearing wheel spindle 13 with respect to the main frame cross bar 11. As the tractor moves forward the cutters 19 operate as intended, the position and inclination of the side bars 17 being such that the device is adapted for simultaneous cutting operation of two rows of stalks or the like. As occasion requires, such as when an uneven ground surface is encountered necessitating the elevation of the cutter blades to maintain a desired evenness of cutting height, the lever 30 is manipulated from the driver's control to raise or lower the cutter element to suit the situation. The attachment is extremely efficient and is quite simple. It requires no change in tractor construction and operates forwardly of a tractor so that the device may be appropriately guided at any time during the operation.

I claim:

1. A tractor cutter attachment comprising, a main frame, means for securing said frame to a tractor axle, a ground bearing wheel in said frame, a movable frame, links pivotally suspending the movable frame from said main frame and pivotally connected to both frames, means for moving said movable frame through a vertical arc relative to said main frame, and blade means on said movable frame.

2. A tractor cutter attachment comprising, an axle attachable main frame, a ground wheel in said frame and vertically movable therein for adjustment, a second frame pivotally suspended from the main frame at two points, cutter means on said second frame, and means for regulating the position of said second frame with respect to the main frame.

In testimony whereof I affix my signature.

SAMUEL C. ATKINSON.